United States Patent [19]
Goodrich

[11] 3,746,785
[45] July 17, 1973

[54] DEFLECTABLE MEMBRANE OPTICAL MODULATOR

[75] Inventor: George W. Goodrich, Bloomfield Hills, Mich.

[73] Assignee: The Bendix Corporation, Southfield, Mich.

[22] Filed: Nov. 26, 1971

[21] Appl. No.: 202,432

[52] U.S. Cl. .................... 178/7.5 D, 65/31, 156/3, 350/161
[51] Int. Cl. ............................................. H04n 5/66
[58] Field of Search ..................... 178/7.3 D, 7.5 D, 178/7.85, 7.87, 7.88; 350/160 R, 162 R, 161

[56] References Cited
UNITED STATES PATENTS
3,667,830   6/1972   Rottmiller ......................... 350/161

OTHER PUBLICATIONS
RCA Technical Note No. 775, Schroeder Oct. 2, 1968

Primary Examiner—Robert L. Richardson
Attorney—Lester L. Hallacher et al.

[57] ABSTRACT

A deflectable membrane optical modulator with an improved substrate for support of the deflectable member is described. The improved substrate supports the deflectable member in close proximity to a parallel contiguously conductive electrode with an array of dielectric pillars of sufficient number and geometrical arrangement so that the supported light reflective deflectable membrane, in the absence of electrostatic forces, forms a mirror with the required optical qualities. The deflectable member is a dielectric membrane and is made reflective by the application of light reflecting materials to its external surface in a manner spatially preserving the dielectric characteristics of the membrane to the same order of magnitude as the spatial resolution defined by the geometrical pattern of the supporting dielectric pillars.

21 Claims, 7 Drawing Figures

PATENTED JUL 17 1973 3,746,785
SHEET 1 OF 2
FIG. 1
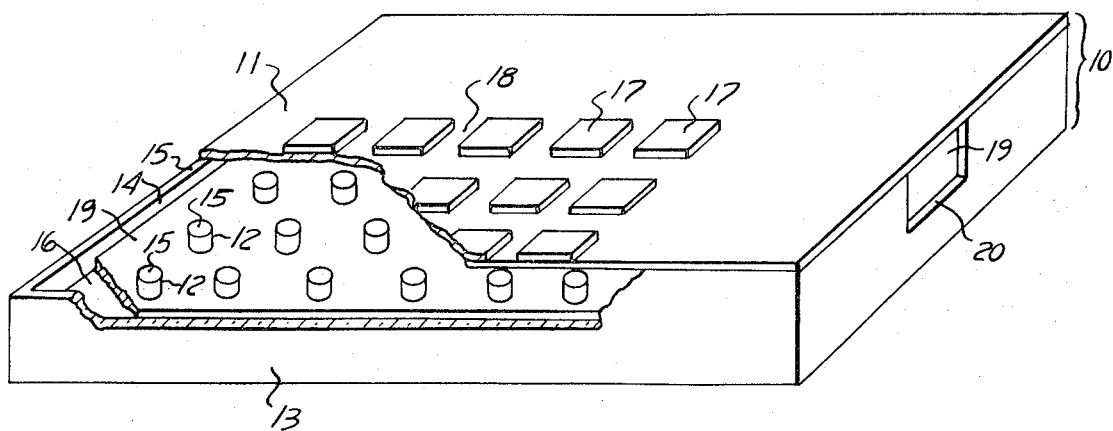
FIG. 3
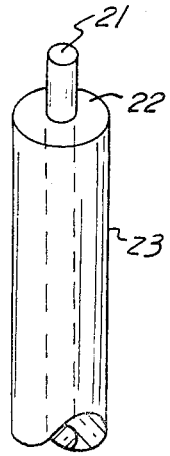
FIG. 2
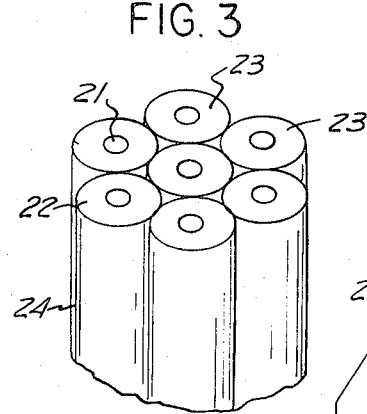
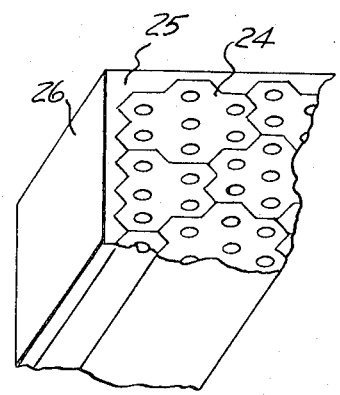
FIG. 4
FIG. 5
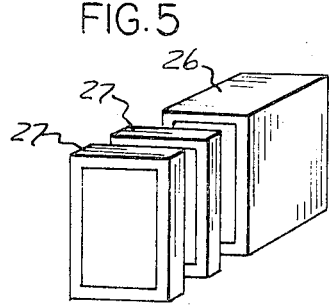

FIG. 6
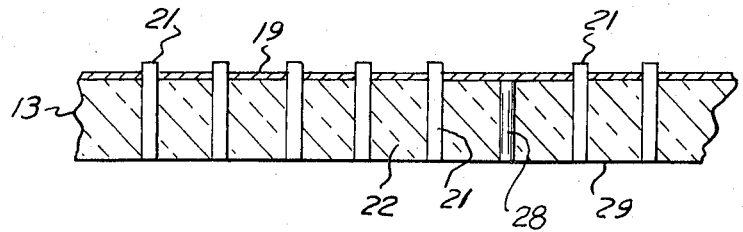
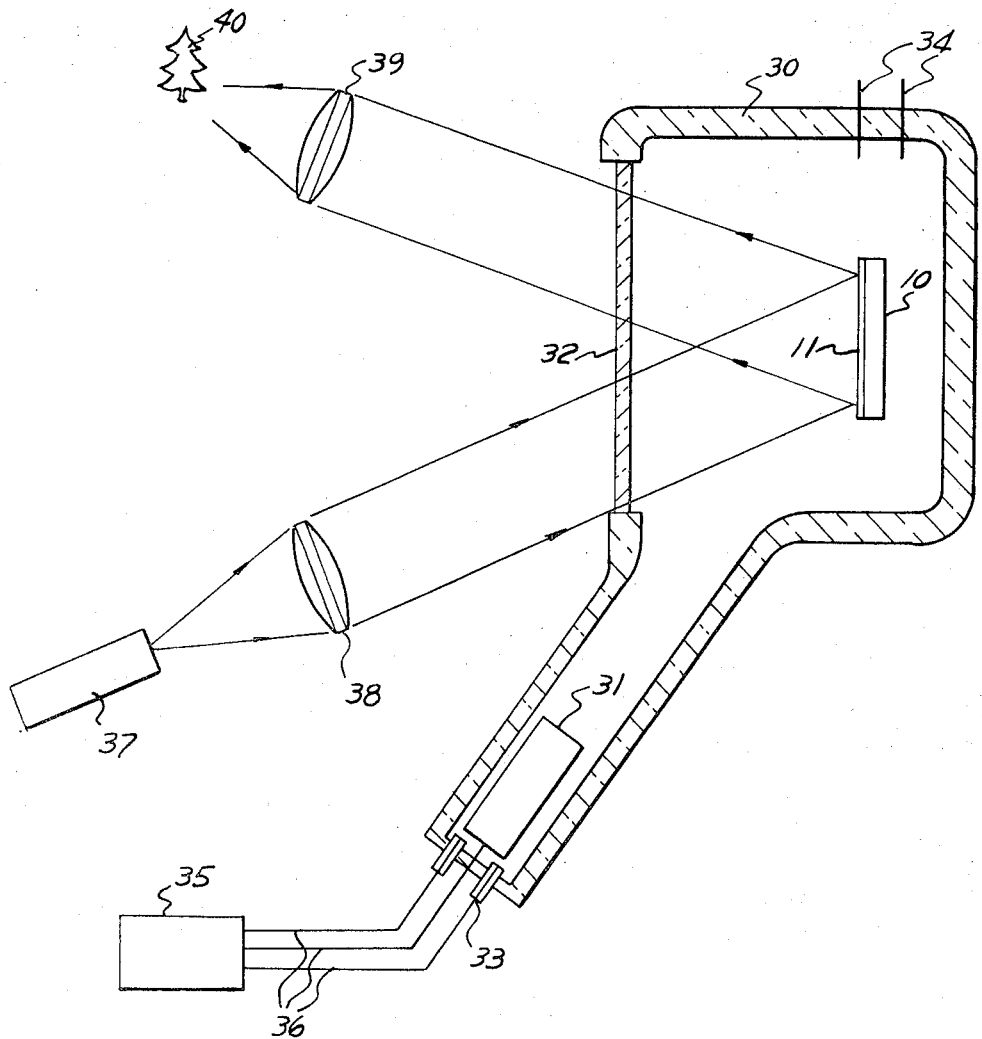
FIG. 7

DEFLECTABLE MEMBRANE OPTICAL MODULATOR

BACKGROUND OF THE INVENTION

Optical phase modulators have been a useful device in display systems for many years and the various commercial and experimental optical phase modulators use a variety of means for modulating the incident light. Probably the best known optical modulating display system is the Eidophor system, which modulates an oil film with an electron beam. The electron beam scanning the oil film deposits electrical charges on the oil film in accordance with the intensity of the electron beam causing the oil film to deform. The variation in the thickness of the oil film thus deformed phase modulates any incident wave energy, imparting the modulation information to the reflected energy. The Eidophor system is widely used in large screen television displays for theaters and similar applications. The use of oil in a vacuum tube apparatus has inherent disadvantages and undesirable characteristics which severely limit its operational life and make the Eidophor system something less than the optimum light modulator for image displays. The fact that it is widely used in spite of its deficiencies adequately demonstrates the need for improved light modulators.

A number of alternate techniques are being explored to overcome the disadvantages of the oil in the Eidophor system. These techniques range from a direct substitution of thermoplastic materials for the oil, to the use of rubber like materials which deform in the presence of a strong electrostatic field. A completely different approach using a deflectable membrane appears superior to the above techniques because it eliminates the use of oil, plastics, and plastic-like materials from within the vacuum enclosure of the light modulator. Oils, rubber, and many plastic-like materials have relatively high vapor pressures, compared to the materials normally considered acceptable in vacuum tube construction, and therefore limit the performance and operational life of these devices.

The deflectable membrane optical modulator consists of a spatially supported light reflective member in close proximity to a parallel electrode or series of electrodes, constructed so that the light reflective member forms an optically flat surface comparable to a mirror when not under the influence of deflective forces. The principle of operation of the deflectable membrane optical modulator is the spatial deformation of the thin member by electrostatic forces. Electrical charges deposited on the dielectric deflectable member develop a potential difference between the membrane and an underlying parallel electrode. This potential difference produces an attractive force which deflects the membrane toward the parallel electrode forming a dimple in the unsupported area. The deflection $y$ of the membrane for a potential $V$ is approximated by the equation:

$$y = k [(\epsilon_o A V^2)/cT d^2)]$$

where:
$\epsilon_o$ = the membrane modulus of elasticity
$A$ = deflected area
$T$ = tension on the membrane
$d$ = distance from membrane to parallel electrode
$V$ = potential between membrane and parallel electrode
$y$ = vertex deflection
$k$ = constant depending on configuration of deflected area $A$ defined by the supports Light impinging on the dimpled membrane is phase modulated in accordance with the geometry and the depth of the deformed areas.

Theoretically, it makes no difference on which element the electrostatic charge is established, or whether the charge is positive or negative. However, a means must be provided in the recipient element to prohibit lateral spread of the deposited electrostatic charge. Two prevalent methods to prohibit the lateral spread of the deposited electrostatic charges are to make the recipient element from a dielectric material or to isolate small conductive elements with a dielectric material.

Various means can be employed to establish the spatial potential difference between the membrane and the parallel electrode. A common method is to write on the recipient element with an electron beam in the same or equivalent manner that an electron gun writes on the phosphor screen of a cathode ray tube. Depending upon the energy of the electron beam, the material of the recipient, and techniques employed, the recipient may be either positively or negatively charged by the incident electron beam. Other means using optical, mechanical or even acoustical energy can be used, provided an appropriate transducer is employed.

Deflectable membrane optical modulators have been made which demonstrate the feasibility of this concept. However, the structures utilized in these optical modulators are relatively inefficient because the structure supporting the deflectable membrane occupies a significant proportion of the total surface area. The active area of such structures is therefore relatively small compared to the total area, and is inefficient. The deflectable area is also supported completely around the perimeter, creating high stresses in the membrane for even small deflections of the area.

SUMMARY OF THE INVENTION

The invention is directed to a deflectable membrane optical modulator with an improved substrate which overcomes the disadvantages of prior art devices and which is useful in reproducing both holographic and real images. The invention is also directed to a method for making the improved substrate. The deflectable membrane optical modulator consists of a highly efficient light reflective deflectable membrane supported in close proximity to a parallel contiguous conductive plane by an array of dielectric supports or pillars, the surface area of said pillars representing a minor portion of the total surface area. The number of dielectric pillars and their geometric location and configuration are designed so that the supported light reflective membrane, in the absence of electrostatic forces, forms a mirror. The supported membrane is an electrical charge recipient and has means for retaining a deposited charge pattern on its surface.

In operation the contiguous conductive underlying electrode is held at a fixed potential and the dielectric membrane is electrically neutral. In the absence of an applied signal, the dielectric membrane assumes the potential of the underlying electrode. When charged particles from an external source impinge on the membrane, an electric charge spatially accumulates on the membrane in a pattern indicative of the signal applied to the charged particle source. Electrostatic attraction between the charged membrane and the underlying contiguous electrode causes the membrane to deflect toward the electrode in the areas between the support pillars, forming dimples in the otherwise planar surface. Considering all other factors constant, the deflection of the membrane varies in accordance with the charge placed on it. Light energy reflected from the surface of the membrane is modulated in accordance with the dimpled pattern. Holographic reconstruction can be obtained by writing on the membrane an electrostatic charge pattern representative of a holographic interference pattern and illuminating the deflected membrane with coherent energy.

In a preferred embodiment the deflectable membrane optical modulator is mounted in a vacuum enclosure, with an electron gun, and a means for deflecting the electron beam emitted by the electron gun. An optically flat window is provided in the vacuum enclosure for transmission of the incident and modulated reflected light. Means are also provided for making electrical contact with the parallel contiguous conductive plane of the optical modulator so that a potential difference can be established between the conductive plane and the electron gun.

The fabrication techniques used for making the substrate with the array of pillars closely parallel the techniques for making etchable glass core microchannel plates. In the fabrication of the substrate a chemically resistant glass core is clad with an etchable glass, forming a coaxial bi-element glass rod. A number of these rods are joined into a bundle by stacking them together and drawing them to form a composite bundle. A number of the composite bundles are stacked within a rim forming a peripheral layer of chemically resistant glass and fused into a composite billet having the desired shape and dimensions. This billet is sliced into a plurality of wafers, which are subsequently ground and optically polished. A small amount of the etchable glass is removed by etching, leaving the chemically resistant rods protruding from the surface. A metallic coating, vacuum deposited on the etched surface, forms a contiguous conductive surface below the tops of the chemically resistant pillars. A deflectable light reflecting membrane is stretched over the pillars and cemented in place, completing the assembly of the deflectable light modulator.

BRIEF DESCRIPTION OF THE DRAWINGS

FIG. 1 is an isometric sectionalized preferred embodiment of the invention.

FIG. 2 illustrates the configuration of part of a coaxial bi-element rod.

FIG. 3 shows part of a composite rod.

FIG. 4 illustrates the configuration of a fused composite billet.

FIG. 5 shows wafers sliced from the billet.

FIG. 6 is a cross-sectional view of a preferred embodiment showing the inclusion of a conductive rod.

FIG. 7 is a preferred embodiment of a system for producing an image with the inventive structure.

DETAILED DESCRIPTION

A preferred embodiment of the inventive light modulator 10 is shown in FIG. 1 and includes a deflectable dielectric membrane 11, supported on an array of dielectric pillars 12 protruding from a dielectric substrate 13. The pillars 12 are arranged in a systematic pattern with the spacings between the pillars larger than the cross-sectional dimensions of the pillars. A preferred arrangement is the systematic location of the pillars at the intersections of orthogonal or 60° oblique grid lines, with the spacings between the pillars approximately twice the pillar cross-sectional dimension. Existing technology permits structures of this type to be made with interpillar distances as small as 6 micrometers or approximately 12 wavelengths of visible radiation. A rim 14 is provided around the substrate for edge support of the membrane 11. The top surfaces 15 of the dielectric pillars 12 and rim 14 form a plane parallel to the surface 16 of the substrate 13 such that the distance between the deflectable membrane, supported by the pillars 12 and rim 14, and the surface 16 is everywhere equal. The top surfaces 15 of the pillars 12 and the rim 14 are ground and polished, so that the plane defined by these surfaces is optically flat. Optically flat is a relative expression, based upon the intended application of the light modulator. For two dimensional imagery, a flatness equal to one-fourth of a wavelength of the incident light is adequate. For holographic applications, a flatness equal to one-twentieth of the incident light or better is normally required. Isolated reflective islands 17 are deposited on the external surface of the membrane to make the dielectric membrane 11 highly reflective to incident light. The size and configuration of the reflective islands 17 are commensurate with the physical spacings and geometrical pattern of the pillars to preserve the inherent resolution of the substrate. In FIG. 1 the pillars 12 and the reflective islands 17 are arranged in comparable square patterns having substantially the same physical dimensions. However, other systematic geometrical patterns such as triangles, hexagon, or other polysided patterns are equally appropriate. The spacings 18 electrically isolate the reflective islands 17 from each other and prohibit the lateral spread of an electrical charge pattern deposited on membrane 11. A metallic layer 19 is deposited along the etched surface 16 to provide a continguous equipotential surface under the deflectable membrane 11. Tab 20 is an external extension of the metallic layer 19 providing a means for making electrical contact to said metallic layer.

The method used for making the dielectric substrate 13 with the array of pillars 12 parallels techniques used in the fabrication of microchannel plates. As shown in FIG. 2, a chemically resistant glass rod 21 is clad with a chemically etchable glass 22. Both glasses should have approximately the same expansion and contraction characteristics to keep the cladding from fracturing and flaking off the rod. As a practical example, the rod 21 may be made from chemically resistant glass such as Corning code 0120 or 0080. The composition of a compatible etchable glass which is soluble in hot water is $B_2O_3$ 45%, $N_2O$ 19%, $SiO_2$ 36% by weight. The etchable glass is clad to the chemically resistant glass by drawing them together through a glass drawing machine, fusing the core and the cladding glasses into a coaxial bi-element rod 23. A number of the bi-element rods 23 are joined into a bundle with their longitudinal axes substantially parallel to each other and drawn in a glass drawing machine, forming a composite rod 24 with a plurality of chemically resistant rods 21 fused in a matrix of etchable glass as shown in FIG. 3. This process may be repeated until a final rod is formed which has the desired number of chemically resistant glass rods with the desired diameters and geometrical spacings. After the desired rod diameter and spacing is achieved, a number of rods 24 are joined together and fused with heat and pressure, forming a composite billet 26 as shown in FIG. 4. The fusion under heat and pressure of the billet 26 causes the glass to flow in the interstitial spaces between the individual glass rods 23, resulting in an integral structure. During the fusion of the billet, the external surfaces of the billet 26 are clad with the rim glass 25 which is also chemically resistant and has approximately the same expansion and contraction coefficient as the other glasses. The rim glass 25 may be the same glass used to make rods 21.

As shown in FIG. 5, the finished billet 26 is sliced through the longitudinal axes of the chemically resistant glass rods 21 into composite wafers 27. The thickness of the wafers is dependent upon the size and specific applications of the optical modulator. One sliced surface of the wafers is ground and optically polished to the required flatness. The polished wafer 27 is subsequently placed in an etching solution where a thin layer, approximately 1 to 2 microns, of the etchable glass is removed, leaving the rim and the array of pillars protruding from the etched surface thus forming the dielectric substrate from the glass composite. The etching process may be of the order of a few minutes to several hours, depending upon the desired etched depth, the etching glass composition and the concentration of the etching solution. The substrate is cleaned and a conductive metal coating 19 is applied to the etched surface 16. If desired, the conductive metal coating 19 can be applied by evaporating a metal in a vacuum at normal incidence to the surface 16. This applies a conductive metal coating to the tops of the pillars, the rim, and the etched surface 16, while the vertical walls of the pillars 12 remain relatively nonconductive. The vertical portions remain nonconductive because they are parallel to the beam of the evaporated metal and the metal deposited thereon is insufficient to form a continuous electrically conductive path.

Various means can be used to provide electrical contact to the conductive metallic surface 19. One method, as shown in FIG. 1, is to make a portion of the rim from the etchable glass used in the cladding 22 of the rod 21. This will leave a hole in the rim coplanar with the etched surface 16 of the substrate, permitting electrical contact to be made directly. The conductive metallic coating 10 extends to the outside of the substrate through the etched section of the rim. The same results may be achieved by grinding a hole through the rim after the etching process has been completed. A third method, which is slightly more complex, involves the inclusion of a metallic wire 28 in one of the rods 23 in place of the chemically resistant glass rod 21, FIG. 6. This permits electrical contact to be made to the conductive surface 19 from the back side 29 of the substrate 13. Any of these techniques, as well as others not described here but within the purview of those skilled in the art, are equally suited to this application.

The deflectable membrane 11, FIG. 1, is formed from a dielectric material such as aluminum oxide. The aluminum oxide membrane may be made by anodizing the sheet of aluminum foil in a weak acid such as tartaric acid to the desired thickness. This thickness may vary from approximately 0.1 micrometers to 0.7 micrometers, depending upon the physical geometry and the distance between supporting pillars. As a typical example, a membrane approximately 0.25 micrometers thick would be used when the distance between the pillars is approximately 40 micrometers. After anodizing the aluminum foil to the desired depth, the remainder of the aluminum is etched away by a strong acid, such as hydrochloric acid, leaving the aluminum oxide membrane.

Reflective islands 17 are systematically deposited on the membrane using conventional vacuum deposition techniques. The islands 17 may be square as shown in FIG. 1, or some other configuration dictated by the geometry of the pillars. It is preferable that the size of the islands be less than or equal to the size of a resolution element defined by the geometry of the pillars. Three adjacent pillars define the smallest possible resolution element; however, a resolution element may be defined by other geometrical arrangements, such as a square or pentagon. The reflective islands, being conductive, permit the electrical charge to spread laterally across the dielectric membrane to the extent of their physical size, therefore islands larger than a resolution element degrade the resolution of the optical modulator. The spaces 18 between the reflective islands 17 should be kept as small as possible so that the ratio of the reflective to the nonreflective areas on the surface of the membrane is high. The membrane 11 with the reflective islands 17 is cemented to the top surfaces 15 of the pillars and rims, using a suitable adhesive. A weak solution of detergent and water has been found to work well.

Another technique for obtaining a dielectric deflectable membrane is to fuse a thin glass membrane to the tops of the protruding glass rods. This is accomplished by stretching a glass membrane taut over the tops of the rods and heating sufficiently to soften the membrane but not the substrate. Surface tension will uniformly stretch the membrane under these conditions.

The completed optical modulator appears as a reflective mirror having a plane surface with a grid configuration created by the spacings 18 between the reflective islands 17. The reflective islands adhere to the deflectable membrane 11 so that deflection of the membrane results in deflection of the island 17. The thickness of the reflective islands 17, therefore the depth of the spacings 18, is very small compared to the wavelength of the energy to be reflected from the optical modulator. Normally, this thickness is less than one-twentieth of the wavelength of the incident light. The manner in which the dielectric membrane is made or which the reflective islands are deposited on the surface of the membrane forms no part of the invention, and any methods presently known to those skilled in the art can be used.

To modulate reflected radiation, an electrostatic image is formed on the membrane, causing it to spatially deflect where electrostatic charges are present. The electrostatic image can be formed by various known techniques. One method is to write on the membrane with a modulated electron beam in a manner similar to writing on the fluorescent screen of a cathode ray tube. The electrons from the electron beam are spatially deposited on the membrane producing attractive electrostatic forces between the membrane 11 and the underlying conductive coating 19, causing the membrane to deflect in the areas between the pillars forming dimples. The deflection is proportional to the number of electric charges deposited on each deflectable element of the membrane, the area of the deflectable elements being determined by the geometry of the pillars supporting the membrane.

Writing on the membrane with an electron beam, in the manner described above, may produce either a positive or negative electrostatic image. When the energy of the electrons in the beam is low, the electrons collect on the membrane and form a negative electrostatic image. However, when the energy of the electrons in the electron beam is high, the impact of the electrons with the membrane causes secondary electrons to be emitted, leaving the surface with a positive electrostatic image. The formation of a positive electrostatic image has the advantage that the incident electrons may cause the emission of one or more secondary electrons providing additional gain to the optical modulator. However, a positive electrostatic image requires a collector grid to collect the emitted secondary electrons, thus preventing them from returning to the membrane and erasing the formed image. Reversing the potential on the collector grid and flooding the membrane with electrons is one method for erasing an electrostatic image from the membrane.

A preferred configuration of a system utilizing the invention is shown in FIG. 7. The system consists of a vacuum enclosure 30, an electron gun 31, and the inventive optical modulator 10 mounted within enclosure 30. An optical window 32 is provided for transmission of the incident and reflected radiation to and from the modulator 10. Electrical feedthroughs 33 provide electrical inputs to the electron gun. Electrical feedthroughs 34 provide electrical inputs to the optical modulator (internal electrical connections not shown). The operation of the optical modulator is as follows. Electrical signals representative of an optical image or hologram from an external source 35 are transmitted through wires 36 to the electron gun 31. The electron gun contains both modulating and beam deflecting means, causing the gun to deposit an electrostatic image upon the deflectable membrane 11 of the optical modulator 10. The deposited electrons form an electrostatic image on the deflectable membrane which causes the membrane to spatially deflect, forming dimples in those areas where electrostatic charges have been deposited.

Radiation from an external source 37, directed by an appropriate optical system 38 through the window 32, is incident upon the dimpled membrane 11 wherein it is reflected. The reflected radiation due to the dimples in the membrane is phase modulated. This phase modulated reflected radiation is transmitted through the window 32, whereafter by appropriate optics 39 image 40 illustrated as a pine tree is formed. This light modulated system can be used for either two-dimensional or holographic image displays. In a two-dimensional system the electron gun deposits an electrostatic image on the deflectable membrane, causing areas on the deflectable membrane to deflect in accordance with the deposited electrostatic image. The membrane is then illuminated with radiation from either a coherent or incoherent external light source. The incident radiation is reflected and phase modulated by the dimpled pattern on the deflectable membrane. The reflected light is transmitted through the window to an external optical system where the modulated radiation is focused with Schlieren optics to reconstruct the image. When used to produce a holographic image, electrical signals representative of a holographic interference pattern are transmitted to the electron gun of the optical modulator system, and a holographic electrostatic image is formed on the deflectable membrane. The dimpled membrane is then illuminated with a coherent radiation source. The incident radiation due to dimples is phase modulated in accordance with the holographic interference pattern written on the membrane. The phase modulated reflected light is transmitted through the optical window and through an appropriate optical system which forms a holographic image. The radiation source, the input optics, the output optics, and electric signal source for the electron gun are readily available elements and their operation and uses are known to those skilled in the art. They are used in this detailed description to illustrate at least two applications of the invented optical light modulator.

What is claimed is:

1. A modulator for modulating incident radiant energy comprising:
   a substrate having at least one substantially flat face, and a plurality of dielectric pillars protruding from said substantially flat face, the tops of said pillars defining an optically flat surface;
   conductive means along said substantially flat face; and
   a continuous, dielectric deflectable member supported on the tops of said pillars, said deflectable member having means along at least one surface of said member for reflecting said incident radiant energy.

2. The modulator of claim 1 further including a perimetrical rim surrounding said substantially flat face for supporting the edge of said deflectable member.

3. The modulator of claim 1 wherein said pillars are arranged in a systematic pattern along said flat face, and the spacings between said pillars exceed the cross-sectional dimensions of said pillars.

4. The modulator of claim 3 wherein said spacing between adjacent pillars is greater than twelve times the wavelengths of the incident radiation.

5. The modulator of claim 4 wherein said spacing between adjacent pillars is approximately twice the cross-section of said pillars.

6. The modulator of claim 4 wherein the distance from the tops of said pillars to said substantially flat face is greater than one half the wavelength of said incident radiant energy so that said deflectable membrane may deflect up to a distance equal to one-half wavelength of the incident radiant energy whereby a phase shift up to 360° may be obtained between energy reflected from a deflected area and energy reflected from a nondeflected area.

7. The modulator of claim 6 wherein the distance between the tops of said pillars to said substantially flat face is one to two micrometers.

8. The modulator of claim 6 wherein said substrate is a composite base of chemically resistance rods fused in a matrix of etchable glass with the longitudinal axes of chemically resistant glass rods substantially parallel to each other and wherein said substantially flat face is a chemically etched face of said composite base, said face being substantially normal to the longitudinal axes of said chemically resistant rods, and said dielectric pillars are the unetched sections of said chemically resistant rods protruding from the etched face.

9. The modulator of claim 8 wherein said conductive means along said substantially flat face is a metallic film.

10. The modulator of claim 3 wherein said pillars are positioned at the intersections of perpendicular grid lines.

11. The modulator of claim 3 wherein said pillars are positioned at the corners of a close packed hexagonal pattern.

12. The modulator of claim 1 wherein said dielectric deflectable member is an aluminum oxide membrane.

13. The modulator of claim 12 wherein said reflective means are metallic islands, systematically arranged along the surface of said aluminum oxide membrane, having spacings between said islands small compared to the size of the island.

14. The modulator of claim 13 wherein said metallic islands are substantially equal in area to the smallest area defined by at least three adjacent rods protruding from said composite base.

15. The modulator of claim 13 wherein said metallic islands are less than the area defined by at least three adjacent rods protruding from said composite base.

16. The modulator of claim 15 wherein spacing between said metallic islands is less than one fourth the effective diameter of said metallic islands.

17. The modulator of claim 13 wherein said metallic islands are squares having side lengths approximately four times the spacings between said metallic islands.

18. The optical modulator of claim 1 further comprising:

a source of radiant energy for illuminating the deflectable member;

a vacuum enclosure having at least one optically flat window;

means for emitting a beam of charged particles;

means for modulating said emitted beam of charged particles; and means for deflecting said modulated beam of charged particles across said deflectable member whereby said beam of charged particles modulated by electrical signals from an external source, deflected across the deflectable member in a predetermined pattern, spatially deposits electrostatic charges on the member causing said member to deflect in the areas where electrostatic charges are deposited and radiation from said radiation source reflected from the deflected area of said deflectable member to be modulated with intelligence representative of the electric signals controlling said beam of charged particles.

19. The optical modulator of claim 18 wherein said source of radiant energy is an incoherent monochromatic light source.

20. The optical modulator of claim 18 wherein said source of radiant energy is a laser.

21. The optical modulator of claim 18 wherein said means for emitting a beam of charged particles is an electron gun.

* * * * *